United States Patent [19]

DeHaai

[11] 4,450,915
[45] May 29, 1984

[54] SELF-PROPELLED DISK HARROW

[76] Inventor: Kermit M. DeHaai, R.R. 1, Monroe, Iowa 50170

[21] Appl. No.: 405,393

[22] Filed: Aug. 15, 1982

Related U.S. Application Data

[63] Continuation of Ser. No. 189,341, Sep. 22, 1980, abandoned.

[51] Int. Cl.³ ............................................. A01B 33/02
[52] U.S. Cl. .................................... 172/55; 172/116; 172/587
[58] Field of Search .................... 172/55, 56, 114, 115, 172/116, 75, 120, 125, 311, 407, 413, 423, 424, 425, 426, 427, 428, 429, 454, 455, 456, 579, 580, 584, 585, 586, 587, 588, 589, 590, 591, 592, 593, 594, 595, 596, 597, 598; 464/147, 153; 403/100, 102

[56] References Cited

U.S. PATENT DOCUMENTS

| Re. 12,575 | 12/1906 | Kurtz | 172/55 |
|---|---|---|---|
| 422,161 | 2/1980 | Ruggles | 172/587 X |
| T875,003 | 6/1970 | Richey | 172/456 |
| 1,017,383 | 2/1912 | Christianson | 172/586 |
| 1,178,283 | 4/1916 | Winter | 464/153 |
| 1,712,815 | 5/1929 | Dwyer | 172/584 X |
| 2,588,701 | 3/1952 | Cook | 172/596 |
| 2,601,818 | 7/1952 | Zwemke | 172/74 |
| 3,080,185 | 3/1963 | Walker | 464/147 X |
| 3,080,933 | 3/1963 | Kramer et al. | 172/594 X |
| 3,550,360 | 12/1970 | van der Lely | 172/456 X |
| 3,590,928 | 7/1971 | Mirus | 172/580 X |
| 3,638,977 | 2/1972 | Purrer | 403/102 X |
| 3,648,780 | 3/1972 | Fueslein et al. | 172/580 X |
| 3,650,333 | 3/1972 | Fueslein | 172/456 X |
| 3,692,121 | 9/1972 | Kenney | 172/456 |
| 3,734,199 | 5/1973 | Tsuchiya et al. | 172/587 X |
| 4,137,853 | 2/1979 | Peterson | 172/311 X |
| 4,174,756 | 11/1979 | De Haai | 172/55 |

FOREIGN PATENT DOCUMENTS 1445103 8/1976 United Kingdom ................ 172/596

Primary Examiner—Richard T. Stouffer
Attorney, Agent, or Firm—Henderson & Sturm

[57] ABSTRACT

A self-propelled disk harrow apparatus having four gangs of disc members attached thereto which are rotated to propel the disk harrow and to thereby till the soil. Wheels are provided for allowing the disk harrow to travel on public roads and to aid in propelling the disk harrow. When the disc members extend too far into the soil or otherwise become ineffective in propelling the disk harrow, for example when in wet or sandy soil, the weight of the disk harrow transfers to the wheels and the wheels tend to primarily propel the disk harrow. A hydraulicly controlled pitch control is provided for controlling how deeply the discs extend into the ground. An automatic coupling structure is also provided for allowing each gang of discs to be folded for extending the effective length thereof and still providing power to all of the discs on each gang. Furthermore, a rear wheel depth control is provided for varying the depth of the rearmost wheels and also the relative position of the wheels along the frame, whereby in the transport position the rearmost wheels are provided on the opposite side of the center of balance of the longitudinal frame from the frontmost wheels, and, during the operation of the disk harrow, the rearmost wheels are moved to a position substantially in alignment with the longitudinal balance point of the apparatus, whereby the apparatus is substantially balanced on the four set of disc gangs.

10 Claims, 13 Drawing Figures

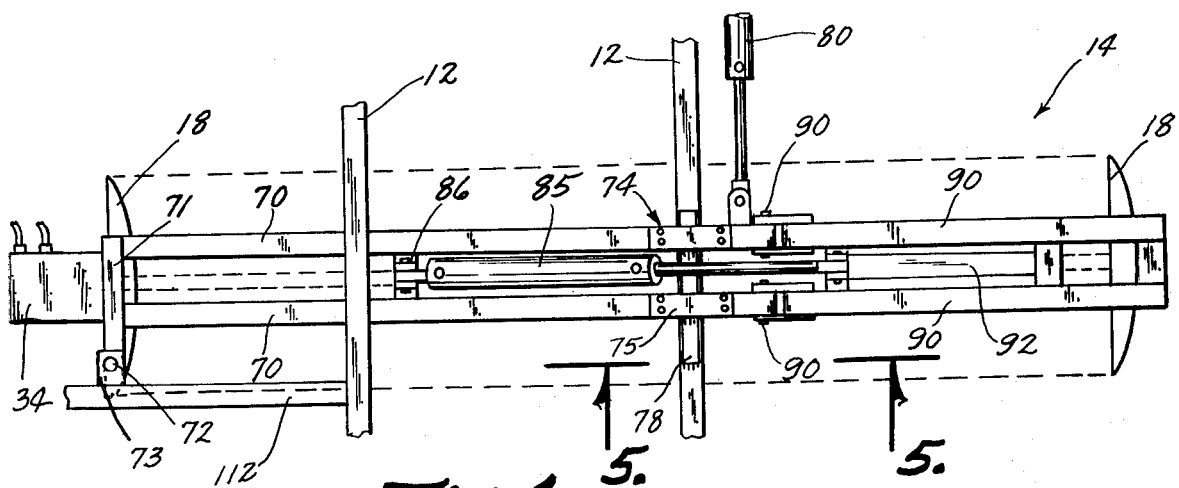
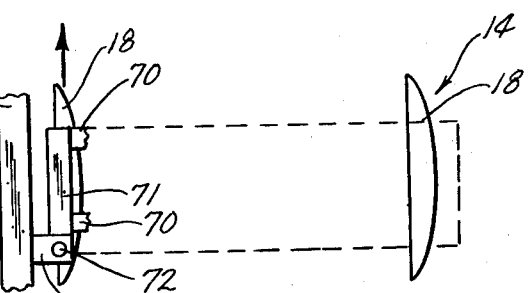
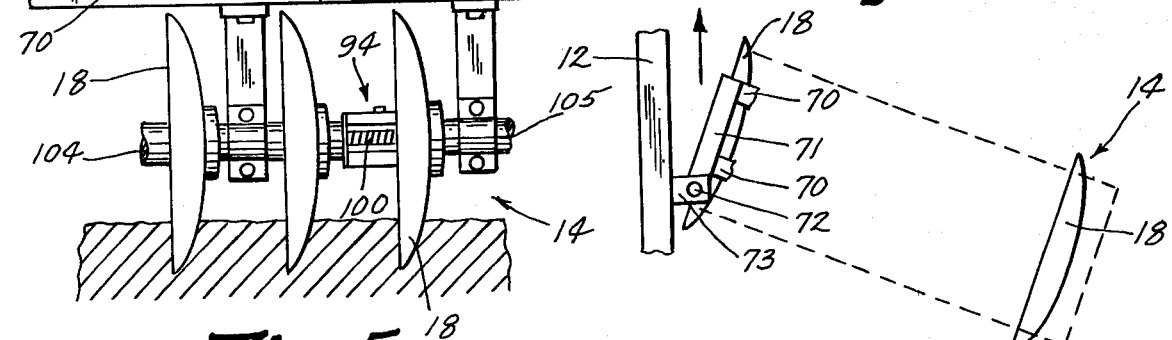
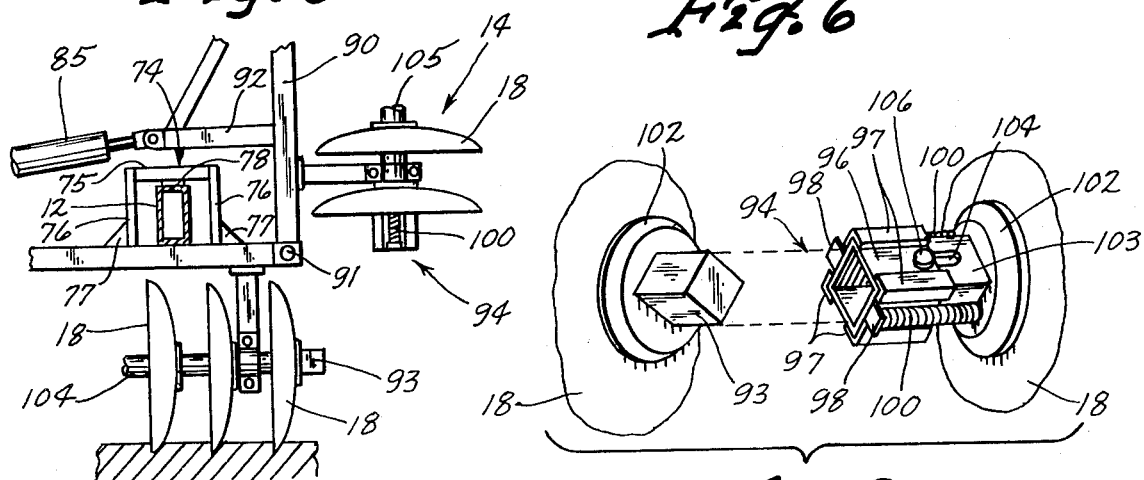

SELF-PROPELLED DISK HARROW

This is a continuation of application Ser. No. 189,341 filed on Sept. 22, 1980, now abandoned.

BACKGROUND OF THE INVENTION

The present invention relates generally to tillage equipment and more particularly to a self-propelled disk harrow apparatus.

Commercially available tillage tools for farming operations tend to be tractor drawn as opposed to being self-propelled. One of the obvious reasons that this is so is because it would be more expensive to make them self-propelled, whereas one tractor can propel a number of different implements, normally one at a time.

A disadvantage of utilizing a tractor to pull a tillage tool such as a disk harrow is that the weight of the tractor tends to compact the soil, and one of the main objectives in the use of a tillage tool such as a disk harrow is to loosen the soil to prepare a good seed-bed. The larger the tractor, the more this compaction factor becomes a problem.

It is also very important when using a tractor drawn disk harrow that the soil not be too wet, otherwise the heavy tractor will sink down into the soil and the disking operation will be a failure.

Commonly, large 4-wheel drive tractors are utilized so that disking operations of the like can be done even when the soil is not an ideal conditions, but, of course, these tractors are extremely expensive and they still have the obvious disadvantage of compacting the soil while the objective is to loosen the soil. These large tractors require large amounts of fuel, but large tractors are indeed necessary when using large implements.

U.S. Pat. No. 12,575 to S. E. Kurtz, issued in 1906, discloses a disk harrow which is self-propelled by rotating the disc members. There is no provision for providing power to the wheels or providing wheels which will prevent the disc members from going into the ground too far. This design has not been a commercial success for the obvious reasons that it would easily become stuck in wet or sandy soil and that it cannot travel on public roads without damaging them.

U.S. Pat. No. 2,601,818 to H. H. Zwemke discloses a tractor drawn disk harrow which includes a mechanism for power rotating the disc members rather than to merely allow them to rotate freely as they are pulled over the ground, as is conventional. The problems associated with this type of a disk harrow are much the same as with a conventional disk harrow; for example, compaction of the soil by the tractor is still a problem, a tractor is needed and it still requires that field conditions be ideal before such apparatus can be used effectively to prepare a seed bed.

U.S. Pat. No. 4,174,756 to K. M. DeHaai discloses a self-propelled disk harrow which overcomes many of the disadvantages referred to above. However, in the course of working out an actual working prototype of this patented structure, other refinements were discovered as will be discussed below.

SUMMARY OF THE INVENTION

The present invention relates to a self-propelled disk apparatus having four gangs of disc members attached thereto which are rotated to propel the disk harrow and to thereby till the soil. Wheels are provided for allowing the disk harrow to travel on public roads and to aid in propelling the disk harrow. When the disc members extend too far into the soil or otherwise become ineffective in propelling the disk harrow, such as because of wet or sandy soil, the weight of the disk harrow transfers to the wheels and the wheels tend to primarily propel the disk harrow. A hydraulicly controlled pitch control is provided for controlling how deeply the discs extend into the ground. An automatic coupling structure is also provided for allowing each gang of discs to be folded for extending the effective length thereof and still providing power to all of the discs on each gang. Furthermore, a rear wheel depth control is provided for varying the depth of the rearmost wheels and also the relative position of the wheels along the frame, whereby in the transport position the rearmost wheels are provided on the opposite side of the center of balance of the longitudinal frame from the frontmost wheels, and, during the operation of the disk harrow, the rearmost wheels are moved to a position substantially in alignment with the longitudinal balance point of the apparatus, whereby the apparatus is substantially balanced on the four set of disc gangs.

An object of the present invention is to provide an improved self-propelled disc apparatus.

Another object of the present invention is to provide a hydraulicly controlled variable pitch apparatus which prevents overlapping of adjacent disc gangs.

A further object of the invention is to provide a balancing structure for the rearmost set of wheels on a self-propelled disk apparatus.

Still another object of the present invention is to provide a means for allowing the driven disc gangs to be pivoted in the center thereof for transportation from place to place.

Other objects, advantages, and novel features of the present invention will become apparent from the following detailed description of the invention when considered in conjunction with the accompanying drawings.

BRIEF DESCRIPTION OF THE DRAWINGS

FIG. 4 is an enlarged view of one of the gangs of the present invention and showing parts of the pitch control and the transport folding structure;

FIG. 5 is partially enlarged cross-sectional view taken along line 5—5 of FIG. 4;

FIG. 6 is a schematic view of the pivoting aspect of the disc gangs showing the disc gangs in an obtuse position with respect to the forward direction movement of the disk harrow;

FIG. 7 shows a schematic view, like FIG. 6, but showing the pitch of the gang in a position transverse to the direction of forward movement of the machine;

FIG. 8 is a view like FIG. 5, but showing the disc gang in the folded position;

FIG. 9 is an enlarged perspective view showing the gang coupling structure for transmitting power from the inner portion of the gang to the outer portion of the gang while allowing the disc gang to be folded for transportation;

DESCRIPTION OF THE PREFERRED EMBODIMENT

Figure 1:
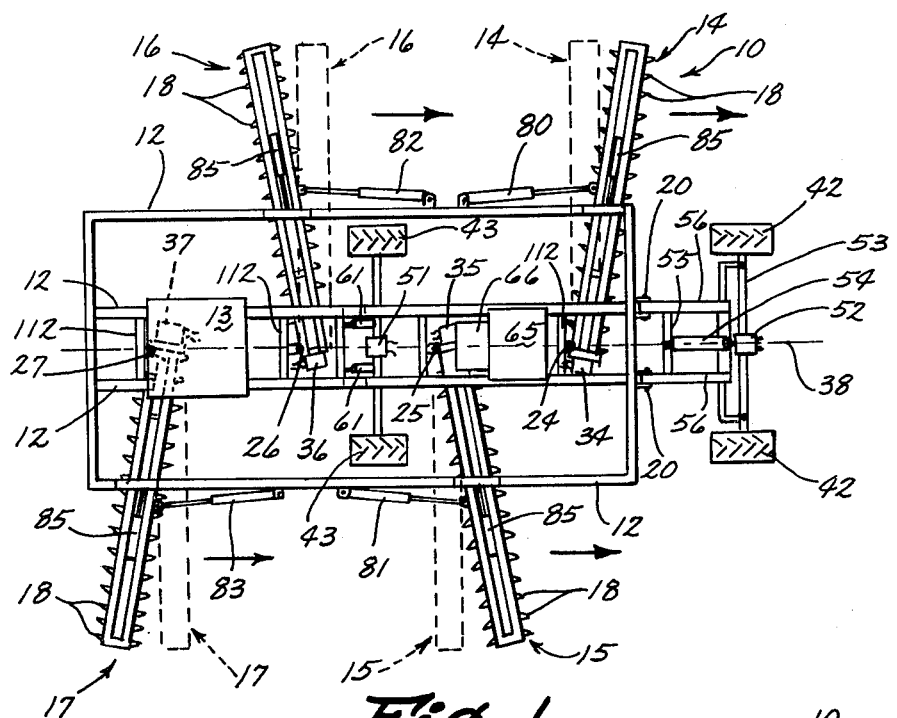
FIG. 1 shows a top plan view of the preferred embodiment of the present invention.

Referring now to the drawings wherein like reference numerals designate identical or corresponding parts throughout the several views, FIG. 1 shows a disk harrow 10 constructed in accordance with the present invention. The disk harrow 10 is substantially like the disk harrow disclosed in U.S. Pat. No. 4,174,756, which patent is incorporated herein by reference; and, to the extent possible, like numerals will be designated for corresponding parts herein. The disk harrow 10 includes a plurality of longitudinal frame members connected together at the ends thereof. A cab 13 is provided at the rear of the device for allowing the operator to see how the machine is functioning, as well as to direct its movement. A first, second, third and fourth gang of discs 14, 15, 16 and 17 are pivotally attached to the frame 12 at pivotal points 24, 25, 26 and 27 along the longitudinal axis 38 of the machine for reasons which will be discussed below with respect to the structure shown in FIG. 13.

The front wheels 42 are powered by a hydraulic motor 52 attached to an axle 53. The front wheels are steered in any one of the conventional ways known; for example, in the manner shown in U.S. Pat. No. 4,174,756. Hydraulic cylinder 54 is pivotally connected to a brace 55 which is in turn originally connected to pivotal members 56 connected at one end to the wheel assembly 42 and pivotally connected at the other end to the frame member 12 by means of pins 20. Actuation of the hydraulic cylinder 54 will tend to move the wheel assembly 42 between the position shown in FIG. 2 and the position shown in FIG. 3.

Figure 2:
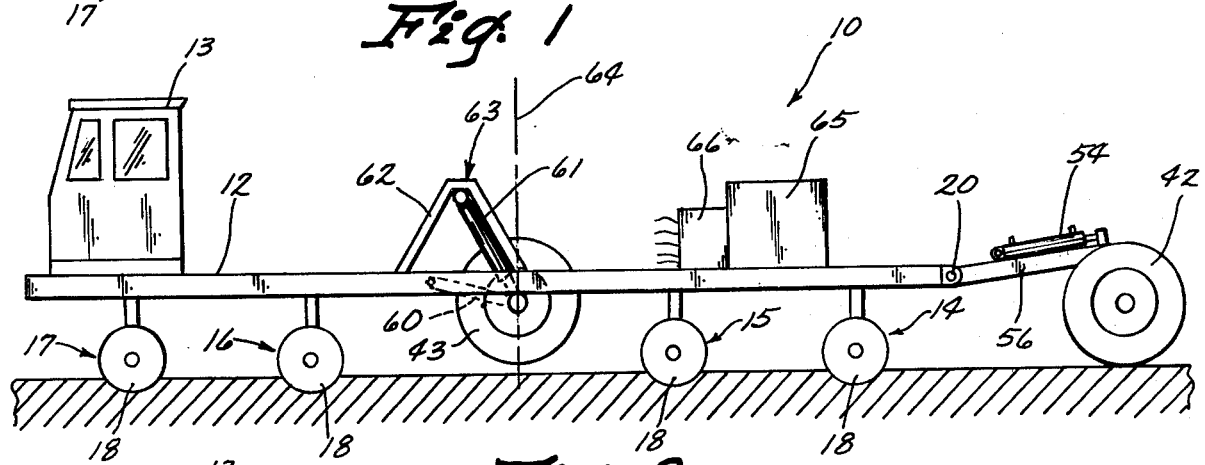
FIG. 2 is a side-elevational view of the apparatus shown in FIG. 1 and showing the apparatus in an earth working position.
Figure 3:
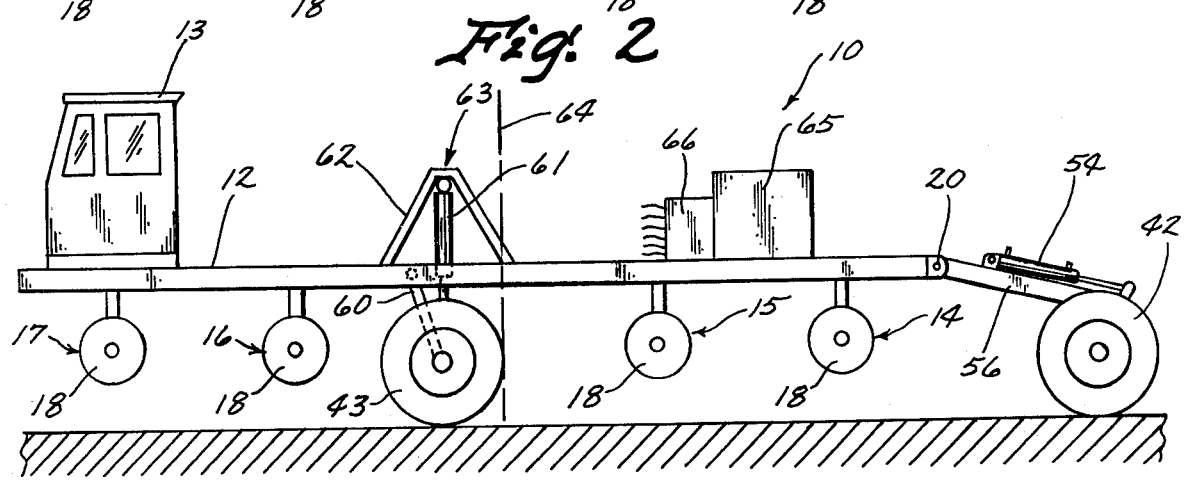
FIG. 3 is a view like FIG. 2, but showing the self-propelled disc in a transport position.

The rearmost wheel assembly 43 is attached to the frame 12 by means of brace members 60 and a pair of hydraulic cylinders 61. An upstanding yoke member 62 is rigidly attached to the frame 12 and provides a pivotal connection 63 at the top thereof to the hydraulic cylinders 61. The bottom of the hydraulic cylinders 61 are connected to the wheel assembly 43 along the same axis as the brace 60. The balance point of the machine is indicated by a line 64 so that generally the weight of the machine is half distributed on one side of the line 64, as shown in FIGS. 2 and 3, and half of the weight of the machine is distributed on the other side of the balance point 64 shown in FIGS. 2 and 3. Consequently, when the wheel assembly 43 is in the position shown in FIG. 2; that is, the working position of the machine, the axis of the wheel assembly 43 is substantially aligned with the balance point line 64, whereas when the machine is in the transport position, the wheel assembly 43 is on the rearward side of the balance point of the machine such that the machine is not likely to tip rearwardly under certain conditions; for example, when the front portion of the disc hits a bump or the like. The control box 65 contains the power plant; for example, a large diesel engine which is attached to a large hydraulic pump 66 which distributes hydraulic fluid to each of the hydraulic pumps and hydraulic cylinders through control valves (not shown) which are located within the cab 13.

Referring now to FIG. 4, it is noted that the hydraulic motor 34 is attached to the main frame 12 and that a secondary frame structure 70 is attached to and above the disc members 18 in each of the gangs. Only a typical gang 14 is shown. Secondary frame members 70 are connected together at the ends 71 and are pivotally attached to the frame 12 by means of a pin 72 attached to a tab 73, which is rigidly attached to the frame 12. A gang or axle support structure 74 is provided for holding the outer ends 70 upwardly. A top portion 75 is rigidly attached to downwardly extending members 76 and reinforcing members 77 to the members 70. A block 78 is provided to minimize the friction between the member 75 and the frame member 12.

Consequently, when it is desired to move the pitch from between the positions shown in FIGS. 6 and 7, the hydraulic cylinder 80 is used. The other end of the hydraulic cylinder 80 is attached to the frame, for example as shown in FIG. 1. When the hydraulic cylinder 80 is in the shortened position, then the disc gang 14 will be in the position shown in FIG. 7, and when the hydraulic cylinder 80 is in the extended position, the gang 14 will be in the position shown in FIG. 6, with respect to longitudinal frame members 12. In like fashion, hydraulic cylinders 81, 82 and 83 are provided for controlling the pitch of gangs 15, 16 and 17, respectively, in the manner that the hydraulic cylinder 80 controls the pitch over the gang 14. Additionally, the gang or axle support structure 74 would be substantially identical along each of the gangs of discs.

Referring now with more particularity to FIG. 5, it is noted that each of the gangs of discs 14–17 are provided with a folding mechanism which includes a hydraulic cylinder 85 which is pivotally attached at one end thereof to the secondary frame members 70, through a coupling 86. Hydraulic cylinder 85 is also pivotally attached at the other end thereof to an upstanding arm member 87, which is rigidly attached to secondary arm members 90 which are, in turn, pivotally attached to secondary arm members 70 by means of pin structures 91. A brace 92 is originally attached to the top of the post member 87 and to the outermost portion of the secondary brace members 90, to provide stability.

The operation of the folding mechanism shown in FIGS. 5 and 6 is simple. When the hydraulic cylinder 85 is in the extended position, as shown in FIG. 5, the secondary frame member 90 aligned with the secondary frame members 70, such that the disk harrow gang would be in an earth working position. When hydraulic cylinder 85 is moved to a shortened position, for example as shown in FIG. 8, the outermost portion of the gang is moved into a vertical position, as shown in FIG. 8 for transportation from place to place.

Of course, when it is desired to again move the folded disc gang down to the earth working position, it is necessary that the upper folded portion of the disc gang engage with the innermost portion of the disc gang, such that the hydraulic motor 34 will be able to turn, not only the inner portion of the gang, but also the outer portion thereof. Accordingly, referring to FIGS. 8 and 9, it is noted that a square projection 93 is rigidly attached to the axle 104 of the gang 14. A mating depression mechanism 94 is attached to the wing portion of each of the gangs and this structure is also fixed to rotate with the axle 105 of the folding point section.

Figure 10:
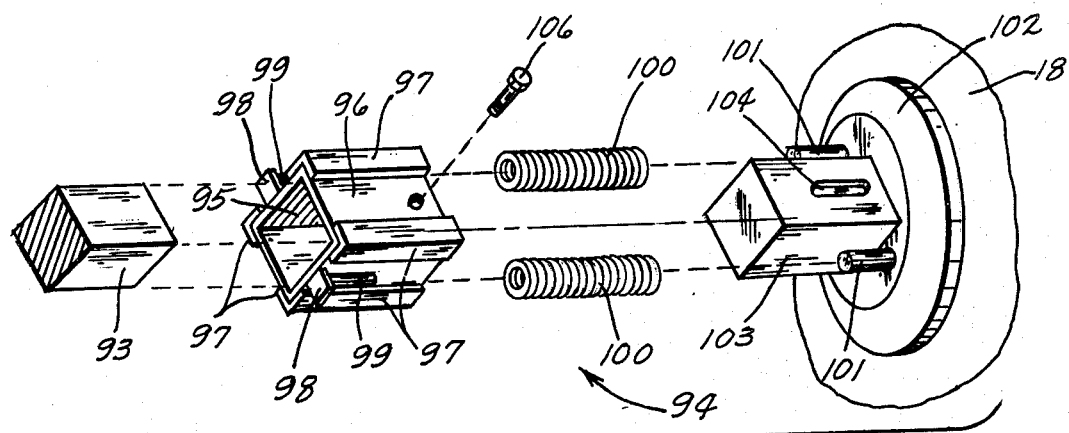
FIG. 10 is an enlarged exploded perspective view of the portion of the coupling apparatus shown in FIG. 9.
Figure 11:
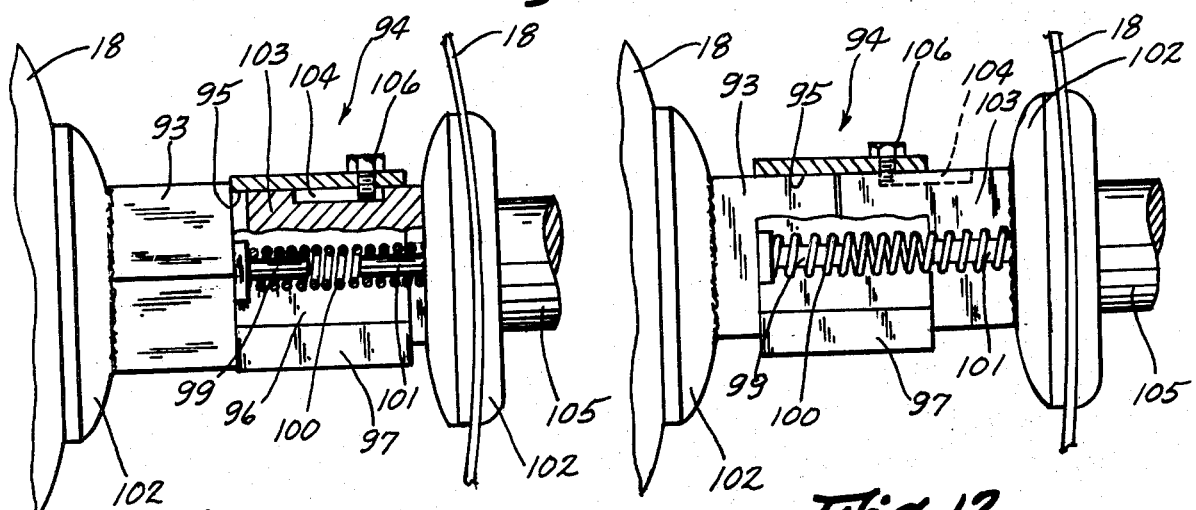
FIG. 11 is an enlarged side-elevational view of the coupler apparatus in a non-aligned position with a portion thereof broken away and showing a cross-section thereof.
Figure 12:
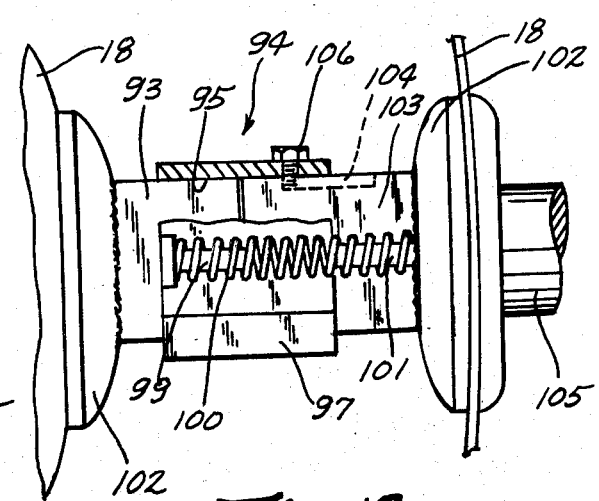
FIG. 12 is a view like FIG. 11, but showing the leftmost gang having been turned until the coupler snaps together for transmitting power from one gang to the other.

Referring in greater detail to the assembly 94, attention is directed to FIGS. 10-12. The non-circular projection 93 is designed to fit in an opening 95 inside of a sleeve 96. This sleeve 96 includes a plurality of corner members 97 and end tabs 98. These end tabs 98 have post members 99 rigidly attached thereto for receiving compression springs 100. These compression springs 100 also fit over post members 101, which are rigidly attached to a hub 102, which is, in turn, rigidly attached to axle 105 of each of the gang members. The center non-circular projection 103 is also rigidly attached to the hub 102 and rigidly attached to the axle 105. The sleeve 96 is slideably received on the projection 103 and an opening 104 is provided in the projection 103. Bolts 106 extend threadably through the sleeve 96 and into the opening 104 for limiting the movement of sleeve 96 between the positions shown in FIG. 11 and the position shown in FIG. 12.

In operation of the connection structures 93 and 94, when the hydraulic cylinder 95 is moved from the position shown in FIG. 8 to the position shown in FIG. 5, the coupler will tend to move together down to the position shown in FIG. 11, since the coupler parts 93 and 94 are very rarely in alignment when they are moved back down to the position shown in FIG. 8 to the position shown in FIG. 5. If they were in exact alignment, the sleeve member 96 would quickly slide over the projection 93 because of the bias of the springs 100. But, as is normally the case, the movement of the sleeve 96 from the position shown in FIG. 11 to the position shown in FIG. 12 does not occur until the hydraulic motor 34 is used to turn the innermost portion of the gang discs; and, when once the projection 93 is aligned with the opening 95 of the sleeve 96 over the projection 93 to form a rotary drive coupling between the axle 94 of the inner portion of the gang with the axle portion 105 of the outer portion of the gang.

Figure 13:
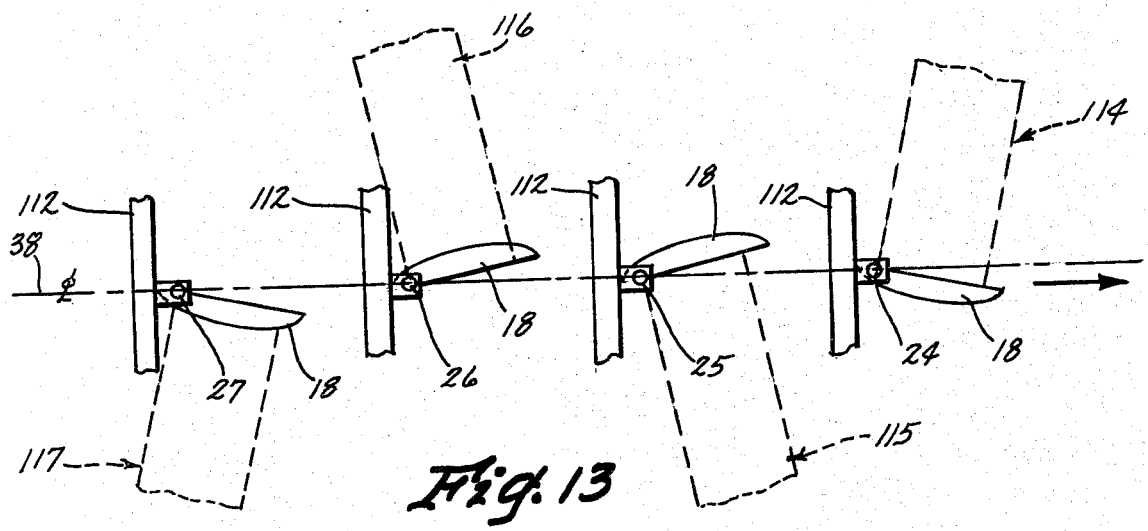
FIG. 13 shows schematically the relative pivotal position of the disc gangs for the purpose of the pitch control aspect of the present invention.

Referring now to FIG. 13 and the relative pivotal points 24, 25, 26 and 27, respectively, of gangs 14, 15, 16 and 17, it is noted that these pivotal points are in alignment along the longitudinal center line 38 of the machine and that the leading edge of the innermost discs 18 on each one of these gangs is generally in alignment with the longitudinal center line when in the position perpendicular with respect to the longitudinal center line 38 (FIG. 7). The outlying portion shown in dashed lines in FIG. 13 which is indicated by numerals 114, 115, 116, 117 generally represent the point at which the disc gangs, on the average, are in the ground and where the disc members intercept the top portion of the ground. The pivotal points 24-27 have been chosen to correspond to the inner section of this average amount of top surface of the ground that the discs are into the ground, and with the leading edge portion of the innermost one of the discs 18 on each gang, for the purpose of preventing the discs which are directly behind one another from overlapping the same ground. For example, it has been determined to be undesirable for the gang 15 to overlap the gang 14 and for the disc gang 17 to overlap the portion of the ground covered by the gang of discs in gang 16. Conversely, it is important that these disc gangs be aligned so that there is not a space between these gangs, which condition would leave a strip of ground untilled.

Accordingly, it is believed to be clear that the embodiment shown accomplishes all of the objects referred to above. Obviously, many modifications and variations of the present invention are possible in light of the above teachings. It is therefore to be understood, that within the scope of the appended claims, the invention may be practiced other than as specifically described.

I claim:

1. In a self-propelled disk harrow apparatus having:

a frame with a longitudinal axis defined thereby;

a plurality of wheels rotatably attached to said frame, the forwardmost of said wheels being spaced longitudinally from the rearwardmost of said wheels by at least one-half the operable length of the frame;

means rotatably mounting a plurality of ground engaging disc members to said frame for causing said disc members to carry substantially all of the weight of said disk harrow during normal tilling operations, said disc members extending a substantial distance below said wheels when said disk harrow is in a ground tilling position, said disc members being disposed on first, second, third and fourth axles, said axles being disposed on different axes with respect to each other, said second axle being disposed behind said first axle, said third axle being disposed behind said second axle and said fourth axle being disposed behind said third axle;

said first and third axles being disposed on one side of said longitudinal axis, said second and fourth axles being disposed on the other side of said longitudinal axis;

means operatively attached to said frame for rotating said disc members to thereby propel said disk harrow and till the ground;

means operatively attached to said frame for rotating at least some of said wheels at substantially the same speed as the rotational speed of said disc members whereby if said disc members extend into the ground more than said substantial distance, a substantial amount of the weight of the disk harrow will transfer to said wheels to help propel the disk harrow and prevent it from becoming stuck;

the improvement comprising pitch adjustment means for varying the angle of the rotational axis of the axles of the first, second, third and fourth axles with respect to the longitudinal axis of the frame, said pitch adjustment means comprising first means for pivotally connecting one end of said first axle to said frame along a first vertical axis; second means for pivotally connecting one end of said second axle to the frame along a second vertical axis, third means for pivotally connecting one end of said third axle to the frame along a third vertical axis, and fourth means for pivotally connecting one end of said fourth axle to the frame along a fourth vertical axis, said first, second, third and fourth vertical axis being substantially disposed along the longitudinal axis of said frame; said first, second, third and fourth vertical axis lying substantially directly above the innermost disc member on each respective one of said first, second, third and fourth axles and the leading edges of the innermost disc members of said first, second, third and fourth axles lying substantially directly upon the longitudinal axis of said frame whereby the disc members on the second axle will not overlap the ground covered by the disc members on the first axle, and the disc members on the fourth axle will not overlap the ground covered by the disc members connected to the third axle.

2. The apparatus of claim 1 wherein said pitch adjustment means includes first, second, third and fourth axle support means attached to respective ones of the first, second, third and fourth axles for slideably supporting the other and of a respective one of said first, second, third and fourth axles to the frame and for allowing movement with respect to the frame when said pitch adjustment means is being utilized; said first axle support means being identical to said second, third and fourth axle support means; said first axle support means including:

a plurality of vertically depending members attached to said first axle;

a plurality of reinforcing elements attached to said vertically depending members and said first axle; and a top portion horizontally disposed between the ends of said vertically depending members; whereby, the longitudinal elements of said frame extend through the opening defined by said vertically depending members, said top portion and said axle; and further wherein each of said first, second, third and fourth pitch adjustment means includes a hydraulic cylinder connected to the frame and operably connected to a respective one of said first, second, third and fourth axles.

3. In a self-propelled disk harrow apparatus having:
a frame with a longitudinal axis defined thereby;
a plurality of wheels rotatably attached to said frame, the forwardmost of said wheels being spaced longitudinally from the rearwardmost of said wheels by at least one-half the operable length of the frame;
means rotatably mounting a plurality of ground engaging disc members to said frame for causing said disc members to carry substantially all of the weight of said disk harrow during normal tilling operations, said disc members extending a substantial distance below said wheels when said disk harrow is in a ground tilling position, said disc members being disposed on first, second, third and fourth axles, said axles being disposed on different axes with respect to each other, said second axle being disposed behind said first axle, said third axle being disposed behind said second axle, and said fourth axle being disposed behind said third axle;
said first and third axles being disposed on one side of said longitudinal axis, said second and fourth axles being disposed on the other side of said longitudinal axis;
means operatively attached to said frame for rotating said disc members to thereby propel said disk harrow and till the ground;
means operatively attached to said frame for rotating at least some of said wheels at substantially the same speed as to rotational speed of said disc members whereby if said disc members extend into the ground more than said substantial distance, a substantial amount of the weight of the disk harrow will transfer to said wheels to help propel the disk harrow and prevent it from becoming stuck;
the improvement comprising pitch adjustment means for varying the angle of the rotational axis of the axles of the first, second, third and fourth axles with respect to the longitudinal axis of the frame, said pitch adjustment means including a first overlap preventing means for preventing the disc members on the second axle from overlapping the ground covered by the disc members on the first axle in any angle of pitch of said first and second axles, said first overlap preventing means comprising first means for pivotally connecting one end of said first axle to said frame along a first vertical axis and second means for pivotally connecting one end of said second axle to the frame along a second vertical axis, said first and second vertical axes being substantially offset with respect to, and thereby not intersecting with, the respective rotational axis of said first and second axles; said pitch adjustment means further including a second overlap preventing means for preventing the disc members on the fourth axle from overlapping the ground covered by the disc members on the third axle in any angle of pitch of said third and fourth axles, said second overlap preventing means comprising third means for pivotally connecting one end of said third axle to said frame along a first vertical axis and fourth means for pivotally connecting one end of said fourth axle to the frame along a fourth vertical axis, said third and fourth vertical axes being substantially offset with respect to, and thereby not intersecting with, the respective rotational axis of said third and fourth axles.

4. A self-propelled disk harrow apparatus of a type defined in claim 2 including at least one of said axles having some of said disc members rigidly connected thereto;

means operatively attached to said frame and to one end of said axle for rotating said axle and thereby said disc members attached thereto;

extension axle means having further disc members rigidly attached thereto;

means for pivotally attaching the extension axle means to the first said axle, said pivoting means including a hydraulic cylinder pivotally connected to the frame and operably pivotally attached to the extension axle means for selectively pivoting the extension axle means between the vertical and horizontal positions;

means for pivoting the first said axle means between a horizontal working position and a vertical transport position;

coupling means for automatically coupling, without need for manual relative rotation, the extension axle means to the first said axle when said extension axle means is in the horizontal position thereof whereby, when fully coupled, rotation of the first said axle will also rotate the extension axle means.

5. The apparatus of claim 4 wherein said coupling means comprises:

non-circular projection means attached to the other end of one of said axle and extension axle means along the axis of rotation thereof; and mating depression means attached to one end of the other of said axle and extension axle means along the axis of rotation thereof whereby the non-circular projection means extends into said mating depression means when said extension axle means is in the horizontal working position thereof.

6. The apparatus of claim 5 wherein said mating depression means comprises a first non-circular member rigidly connected to one of the axle and extension axle means and a non-circular mating hollow sleeve slideably disposed over said first non-circular member;

means for biasing said hollow sleeve towards said non-circular projection means to thereby insure positive engagement of the projection means within said hollow sleeve member.

7. The apparatus of claim 6 including means for limiting the relative sliding movement between the first non-circular member and said non-circular hollow mating sleeve member.

8. In a self-propelled disk harrow apparatus having:

a frame;

a plurality of wheels rotatably attached to said frame, the forwardmost of said wheels being spaced longitudinally from the rearwardmost of said wheels by at least one-half the operable length of the frame;

means rotatably mounting a plurality of ground engaging disc members to said frame for causing said disc members to carry substantially all of the weight of said disk harrow during normal tilling operations, said disc members extending a substantial distance below said wheels when said disk harrow is in a ground tilling position, said disc members being disposed on first, second, third and fourth axles, said axles being disposed on different axes with respect to each other, said second axle being disposed behind said first axle, said third axle being disposed behind said second axle and said fourth axle being disposed behind said third axle;

means operatively attached to said frame for rotating said disc members to thereby propel said disk harrow and till the ground;

means operatively attached to said frame for rotating at least some of said wheels at substantially the same speed as the rotational speed of said disc members whereby if said disc members extend into the ground more than said substantial distance, a substantial amount of the weight of the disk harrow will transfer to said wheels to help propel the disk harrow and prevent it from becoming stuck;

the improvement comprising:

rear wheel control means for controlling the position of said rearwardmost wheels with respect to the frame, said rear wheel control means including means for selectively moving said rear wheel means through an arc from a first transport position wherein said wheel is spaced downwardly from the frame to lift the disc members upwardly and wherein said rear wheel means is disposed rearwardly of the longitudinal balance point of the apparatus and a second working position in which said rear wheel means is disposed substantially at the longitudinal balance point of the apparatus whereby the disk members will tend to be balanced even in rough terrain or under wet conditions.

9. The apparatus of claim 8 wherein said rear wheel control apparatus includes a hydraulic cylinder means pivotally attached to said frame and operably pivotally attached to said rearwardmost wheels for moving said rearwardmost wheels to said lowered transport position when extended and moveable to the second raised working position when said hydraulic cylinder is shortened.

10. The apparatus of claim 9 including brace means pivotally attached to the frame and operably pivotally attached to said rearwardmost wheels for stabilizing the rearwardmost wheels.

* * * * *